US012687473B2

(12) United States Patent (10) Patent No.: US 12,687,473 B2
Fistler et al. (45) Date of Patent: Jul. 21, 2026

(54) INFINITELY ADJUSTABLE STUD TORQUE-OFF SOCKET ASSEMBLY

(71) Applicant: FCA US LLC, Auburn Hills, MI (US)

(72) Inventors: Mark Robert Fistler, Armada, MI (US); Joseph Edward Beckham, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 378 days.

(21) Appl. No.: 18/495,884

(22) Filed: Oct. 27, 2023

(65) Prior Publication Data

US 2025/0137896 A1 May 1, 2025

(51) Int. Cl.
*G01N 3/22* (2006.01)
(52) U.S. Cl.
CPC ....... *G01N 3/22* (2013.01); *G01N 2203/0021* (2013.01); *G01N 2203/0041* (2013.01); *G01N 2203/0067* (2013.01); *G01N 2203/0296* (2013.01)
(58) Field of Classification Search
CPC ............. G01N 3/22; G01N 2203/0021; G01N 2203/0041; G01N 2203/0067; G01N 2203/0296
See application file for complete search history.

(56) References Cited

U.S. PATENT DOCUMENTS

| | | | |
|---|---|---|---|
| 5,773,722 A * | 6/1998 | Helderman | .............. G01N 3/08 |
| | | | 73/826 |
| 10,239,153 B2 | 3/2019 | Workman | |
| 2005/0008427 A1 | 1/2005 | Huber et al. | |

FOREIGN PATENT DOCUMENTS

| | | | |
|---|---|---|---|
| CN | 101368895 B | 6/2011 | |
| CN | 203791920 U | 8/2014 | |
| CN | 109556972 A * | 4/2019 | .............. G01N 3/22 |
| CN | 111458237 A | 7/2020 | |
| DE | 102017222229 A1 * | 6/2019 | .............. G01N 3/04 |
| DE | 102017222230 A1 * | 6/2019 | .............. G01N 3/22 |
| JP | 2006275898 A | 10/2006 | |
| KR | 20230032388 A * | 3/2023 | .............. G01N 3/04 |

* cited by examiner

*Primary Examiner* — Jonathan M Dunlap
(74) *Attorney, Agent, or Firm* — Jeremy J. Klobucar

(57) ABSTRACT

A testing apparatus for torque off weld stud testing has a socket to receive a weld stud welded to a metal sheet for testing strength of the weld. A stopper is received in the socket indexing the weld stud. A nut locks the stopper in position to enable repeated socket indexing to like weld studs.

14 Claims, 2 Drawing Sheets

INFINITELY ADJUSTABLE STUD TORQUE-OFF SOCKET ASSEMBLY

FIELD

The present disclosure relates to testing apparatus and, more particularly, to a testing apparatus for torque failure of weld studs.

BACKGROUND

This section provides background information related to the present disclosure which is not necessarily prior art.

Torque-off testing breaks a weld at the sheet metal where a weld stud is attached to the sheet metal. This is for the purpose of recording a torque value associated with the breakage. The load imparted during torque off testing is intended to be pure torsion, devoid of a bending load component. Data from this test is utilized to approve additional weld studs and sheet metal for vehicle applications. However, data generated from destructive torque-off stud weld testing is subject to excessive variation using current methods.

The existing methods of conducting torque-off tests are susceptible to the application of unintentional, additional, concurrent bending moments that can result in excessive failure torque variations. The current method also risks potential damage of the weld during pretest nut/lock nut set-up, further affecting test data variations. In addition to being sources of test variability, these potential perturbances result in data that understates weld performance.

Additionally, the generation and testing of additional weld stud assemblies is required where the data variation makes performance acceptability initially indeterminate. This adds further time and cost to the evaluation process. Data variability reduces confidence in weld performance sufficiency, potentially leading to unnecessary rejection of highly efficient drawn arc welding processes, specific drawn arc weld studs, or specific sheet metal materials that can improve vehicle level efficiency through weight reduction while maintaining or improving performance.

Current methods of torque-off weld testing utilize a nut and lock nut combination. This is used to impart loads to the weld during torque-off testing. Other approaches for conducting this testing are unknown. Thus, a torque wrench is positioned onto the nut and it is torqued until weld failure. This, however, also brings bending moments and the like into the process.

Further, past practices of the nut and lock nut combination contribute to testing variation in two ways. First, pretest torquing of the nut/lock nut combination, on the test stud, has the propensity to unintentionally damage the weld without indication to the operator. This leads to artificially low and highly variable destructive torque value readings. Second, the torque wrench distance to the sheet metal is not well controlled. This increases the likelihood of variable, unintended bending moment introduction during testing. This, in turn, leads to artificially low and/or highly variable destructive torque values. High variability requires more material and time to generate additional test samples to improve confidence and increases difficulty in making approval decisions.

Accordingly, the present disclosure overcomes the shortcomings of the prior art. The present disclosure provides repeatable position of a torque wrench used to apply and measure torque at a consistent distance from the sheet metal. The positioning of the torque wrench at a minimum distance from the test weld also reduces or eliminates unintended bending moment introduction. The present disclosure eliminates the potential for pre-test welding damage by making lock nut tightening a remotely performed action versus the insitu current operation. Pre-test damage is an additional contributor to test data variability. The present disclosure provides an opportunity to minimize material required for sample generation. Also, it minimizes the time required for generating and testing of an increased number of test samples. Further, it minimizes complexity and the time associated with approval decision making.

The present disclosure reduces test data variation by enabling the position of the stopper to be locked while the socket is remotely disengaged from the test stud eliminating the potential for pre-test weld damage. The present disclosure reduces test data variation by establishing consistent, minimized sample-to-sample position variability of the torque application tool (wrench) relative to the weld located on the sheet metal to reduce the likelihood of unintentional bending moment application. The present disclosure improves the probability of collecting necessary data with a minimum number of test samples, saving time and material. The present disclosure provides a one time lock nut torquing process that reduces total time required to complete testing. The present disclosure enables long term use of consistent test set-up dimensions with low rigor to enable valuable long term performance comparisons that support material approval decision-making processes. The present disclosure Increases confidence in approval decisions for drawn arc weld studs and sheet metal.

SUMMARY

This section provides a general summary of the disclosure, and is not a comprehensive disclosure of its full scope or all of its features.

According to the present disclosure, an apparatus for weld stud torque-off testing comprises a socket to be secured on a weld stud. A stopper is received in the socket to index the weld stud. A nut locks the stopper in position to enable identical indexing to additional like studs. A flange is secured at one end of the socket to position a torque wrench at a desired distance from the sheet metal. The socket has a polygonal exterior surface to mate with a torque wrench. The through bore is threaded in the socket to enable a threaded stopper to be inserted into the socket. The lock is generally a threaded nut placed onto the threaded stopper. The socket may receive different types of weld studs.

Accordingly to the disclosure, a method for using the testing apparatus comprises providing a weld stud welded to a sheet metal material. The socket is positioned onto the weld stud at a desired distance from the sheet metal. The stopper is positioned onto the socket and contacts the weld stud. The stopper is locked on the socket at the contact position. The torque wrench is positioned onto the socket and is rotated until failure of the weld. The torque is measured at the failure value of the weld. The flange enables the positioning of the torque wrench at a desired consistent position from the sheet metal. The stopper position in the socket is fixed by tightening of the nut against the socket. Additional weld studs can be tested without adjusting the apparatus. The stopper can be readjusted to enable the apparatus to be utilized at varying positions on varying length weld studs. Also, the failure torque value is recorded along with the failure mode of the weld.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figures 1, 2:
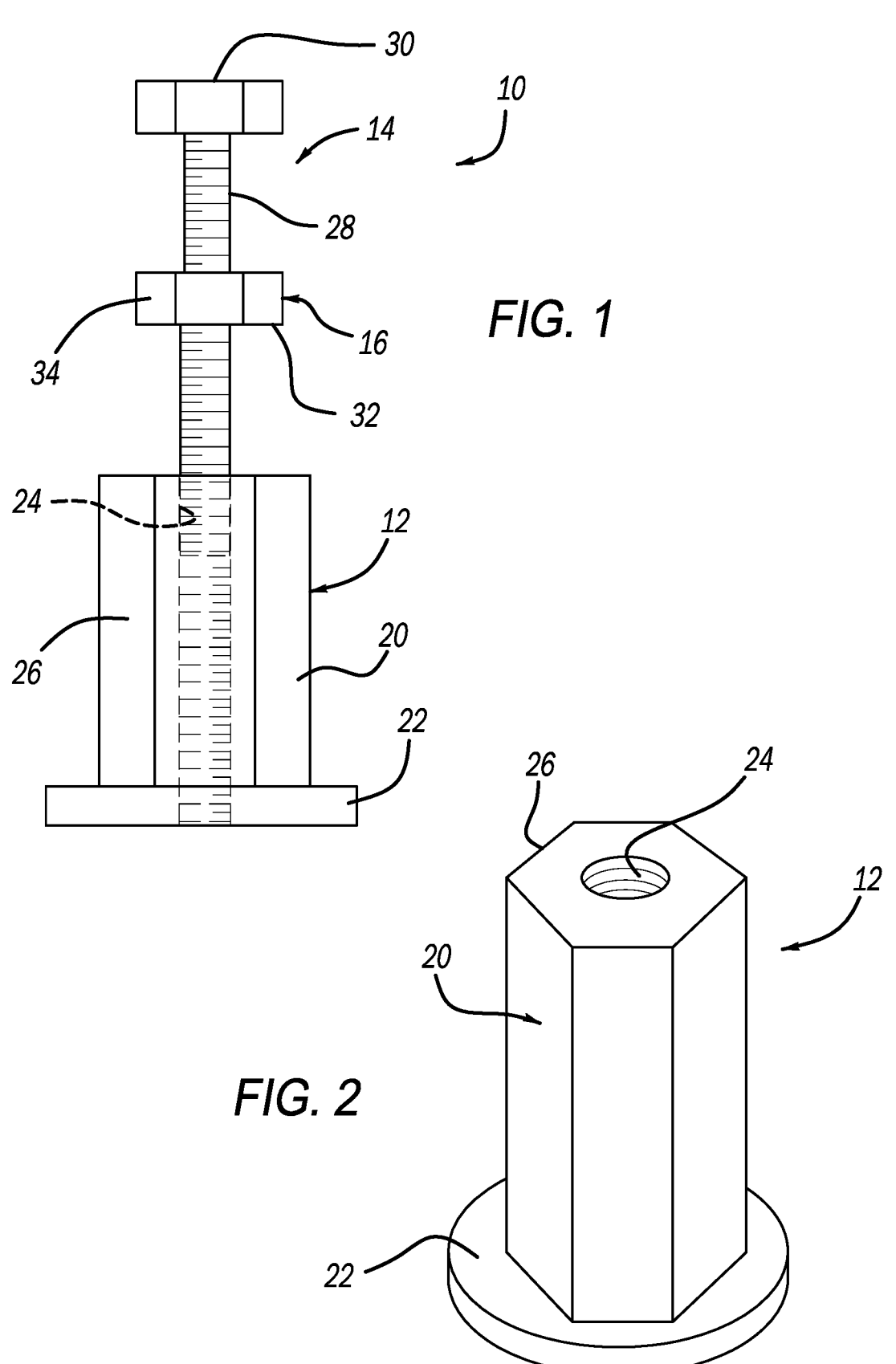
FIG. 1 is an assembled side view of the testing apparatus.
FIG. 2 is a perspective view of the socket.

Example embodiments will now be described more fully with reference to the accompanying drawings.

Turning to the figures, a testing apparatus for torque-off weld stud testing is illustrated and designated with the reference numeral 10. The apparatus 10 includes a socket 12, a stopper 14 and the nut 16. A weld stud 18 is received in the socket 12.

The socket 12 includes a body 20 and a flange 22 secured at one end of the body 20. A through bore 24 passes through the socket body 20. The through bore 24 is generally threaded. The exterior surface 26 of the body 20 has a polygonal configuration. It is shown as a hexagon in the drawings. However, others could be used. The hexagon design works well with a torque wrench.

The stopper 14 is generally a threaded bolt. The stopper 14 has a threaded shaft 28 and a hexagonal head 30. This enables the stopper 14 to be screwed into the threaded bore 24 to contact the weld stud 18 as will be explained later. The nut 16 has an overall hexagonal exterior surface 34. Thus, the hex nut 32 can be tightened with a conventional wrench.

The thickness of the flange 22 can be varied to meet a standard distance from a wrench shank centerline 40 to the metal sheet 38. It is generally designed for the size of the test torque wrench head.

Figure 3:
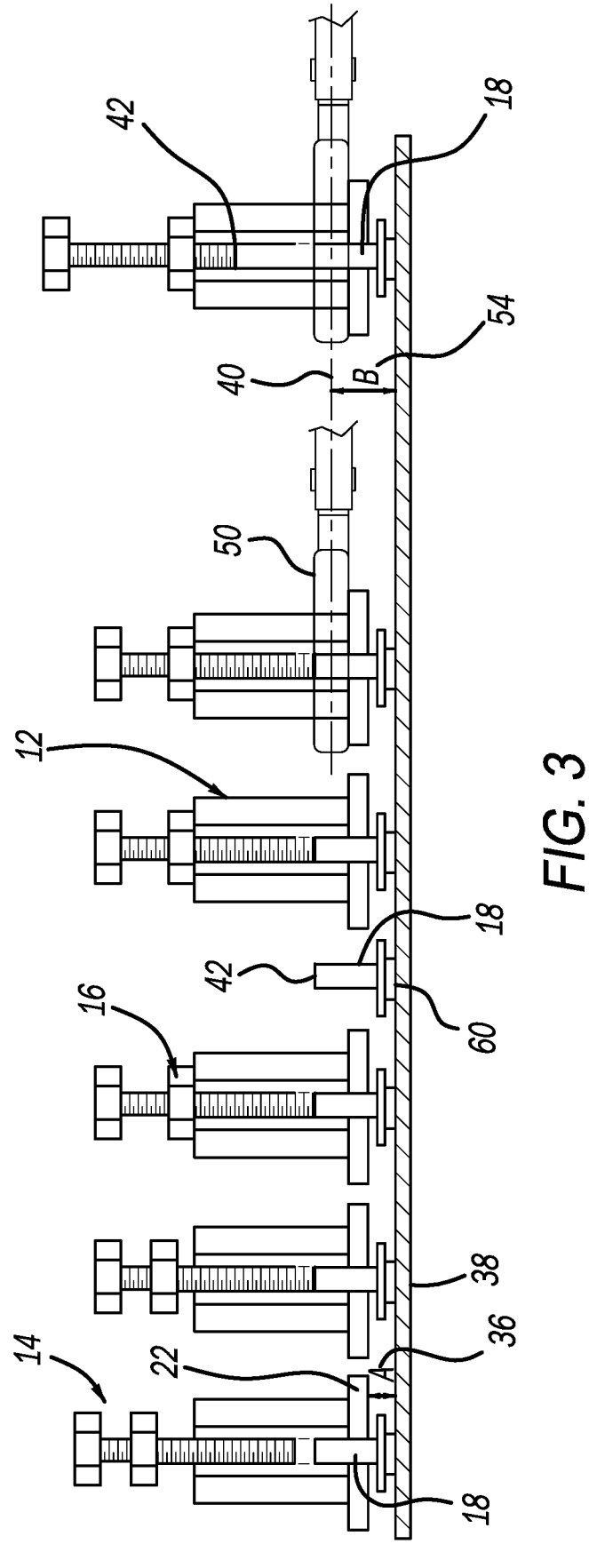
FIG. 3 is an elevated view of the method.

Turning to FIG. 3, a method for testing weld failure with the apparatus 10 will be explained.

The apparatus 10, via the socket 20, is screwed onto a weld stud 18 via the threaded bore 24. The socket 20 is screwed onto the weld stud 18 so that a desired distance or gap 36 is present between the metal sheet 38 and the flange 22. The gap 36 is predetermined and calculated to position a torque wrench centerline 40 at a targeted distance from the surface of metal sheet 38. After the socket 12 is positioned on the weld stud 18, the stopper 14 is advanced in the threaded bore 24 until the end of the shaft 28 contacts an end of the shaft 42 of the weld stud 18. After that, the lock nut 16 is hand tightened nesting on the socket 12. The apparatus 10 is then removed from the weld stud 18. At that time, the nut 16 is mechanically tightened onto the socket 12 to position the stopper 14 in a locked position.

After tightening the apparatus 10 is positioned back onto the weld stud 18. A torque wrench 50 is then positioned onto the outer hexagonal surface of the socket 12. The torque wrench 50 defines the centerline 40 which is positioned at a desired gap distance 54 from the metal sheet 38. Due to the flange 22, the distance 54 is repeatable and prohibits moment bending of the weld stud 18 during application of torque by the wrench 50. The wrench 50 is continued to be rotated. The torque is measured when the failure of the weld 60 occurs. This measurement is recorded to provide the failure torque value. Also, the failure mode is recorded for analysis purposes.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A testing apparatus for torque off weld stud testing comprising:
   a socket including a body including a first end that is configured to receive a weld stud welded to a metal sheet;
   a stopper received in an opposite second end of the socket for indexing the weld stud; and
   a nut for locking the stopper in position for enabling indexing to like weld studs,
   wherein a flange that extends outward from the first end of the body is secured at the first end of the socket, the flange being configured to position a torque wrench at a distance from the metal sheet.

2. The testing apparatus of claim 1, wherein the body of the socket has a polygonal exterior surface to mate with the torque wrench.

3. The testing apparatus of claim 1, wherein the stopper is a threaded fastener.

4. The testing apparatus of claim 1, wherein the nut is a threaded nut.

5. The testing apparatus of claim 1, wherein the socket has a through bore configured for receipt of the stopper.

6. The test apparatus of claim 1, wherein the socket receives different types and lengths of weld studs for testing.

7. A method for testing a weld with a testing apparatus having a socket for receiving a weld stud welded to a metal sheet, a stopper received in the socket indexing the weld stud, and a nut for locking the stopper in position for enabling indexing to like weld studs, the method comprising the steps of:
   providing the weld stud welded to the metal sheet;
   positioning the socket onto the weld stud at a desired distance from the metal sheet;
   positioning the stopper into the socket and contacting weld stud;
   tightening the nut against the stopper at the contact position;
   positioning a torque wrench onto the socket;
   rotating the torque wrench until failure of the weld; and
   measuring failure torque value of the weld.

8. The method of claim 7, further comprising positioning the torque wrench on the flange.

9. The method of claim 7, further comprising removing the socket and tightening the nut onto the stopper and socket.

10. The method of claim 7, further comprising testing additional weld studs welded to a metal sheet.

11. The method of claim 7, further comprising loosening the nut and applying the socket to a different length welded weld stud and measuring the torque failure value.

12. The method of claim 7, further comprising threading the socket onto the weld stud.

13. The method of claim 7, further comprising setting a gap from the sheet metal for the torque wrench via the flange.

14. The method of claim 7, further comprising recording the failure torque value and failure mode of the weld.

\* \* \* \* \*